United States Patent
Ioffe et al.

(10) Patent No.: US 11,044,787 B2
(45) Date of Patent: Jun. 22, 2021

(54) LINK MONITORING REPETITION LEVEL FEEDBACK FOR COMMUNICATION SYSTEMS

(71) Applicant: Apple Inc., Cupertino, CA (US)

(72) Inventors: Anatoliy Ioffe, Hillsboro, OR (US); Ralf Bendlin, Cedar Park, TX (US); Debdeep Chatterjee, San Jose, CA (US); Marta Martinez Tarradell, Hillsboro, OR (US); Seau S. Lim, South Wales (GB); Elmar Wagner, Neubiberg (DE); Yang Tang, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/328,543

(22) PCT Filed: Jul. 27, 2017

(86) PCT No.: PCT/US2017/044094
§ 371 (c)(1),
(2) Date: Feb. 26, 2019

(87) PCT Pub. No.: WO2018/063485
PCT Pub. Date: Apr. 5, 2018

(65) Prior Publication Data
US 2019/0215909 A1 Jul. 11, 2019

Related U.S. Application Data

(60) Provisional application No. 62/402,154, filed on Sep. 30, 2016.

(51) Int. Cl.
*H04W 88/10* (2009.01)
*H04L 1/00* (2006.01)
(Continued)

(52) U.S. Cl.
CPC .......... *H04W 88/10* (2013.01); *H04L 1/0003* (2013.01); *H04L 1/0025* (2013.01);
(Continued)

(58) Field of Classification Search
CPC ... H04L 1/0003; H04L 1/0025; H04L 1/0026; H04L 1/08; H04L 5/0094; H04W 88/10;
(Continued)

(56) References Cited

U.S. PATENT DOCUMENTS

2016/0262109 A1* 9/2016 Chen .................. H04W 4/70
2017/0141833 A1* 5/2017 Kim ................... H04L 1/0029
(Continued)

FOREIGN PATENT DOCUMENTS

| EP | 2919534 A1 | 9/2015 | |
| EP | 3051894 A1 * | 8/2016 | ............ H04L 1/08 |
| WO | 2017/160351 A1 | 9/2017 | |

OTHER PUBLICATIONS

R4-166520; "NB-IoT RLM Enhancement for Rel-14"; 3GPP TSG-WG4 Meeting #80 Gothenberg, Sweden, Aug. 22-26, 2016; Qualcomm. (Year: 2016).*
(Continued)

*Primary Examiner* — Benjamin H Elliott, IV
(74) *Attorney, Agent, or Firm* — Eschweiler & Potashnik, LLC

(57) ABSTRACT

An apparatus is configured to be employed within a base station. The apparatus comprises baseband circuitry which includes a radio frequency (RF) interface and one or more processors. The one or more processors are configured determine repetition level (RL) thresholds, allocate downlink resources, wherein the downlink resources include a repetition level (RL), send downlink data to the RF interface for transmission to a user equipment (UE) according to the RL, receive repetition feedback from the RF interface based
(Continued)

on the transmission to the UE, and update aspects or the allocation of the downlink resources based on the repetition feedback.

16 Claims, 7 Drawing Sheets

(51) Int. Cl.
    *H04L 1/08* (2006.01)
    *H04W 4/70* (2018.01)
    *H04L 5/00* (2006.01)
    *H04W 68/00* (2009.01)
    *H04W 88/06* (2009.01)
    *H04W 84/04* (2009.01)

(52) U.S. Cl.
    CPC .............. *H04L 1/0026* (2013.01); *H04L 1/08* (2013.01); *H04L 5/0094* (2013.01); *H04W 4/70* (2018.02); *H04W 68/005* (2013.01); *H04W 88/06* (2013.01); *H04W 84/042* (2013.01)

(58) Field of Classification Search
    CPC ..... H04W 4/70; H04W 68/005; H04W 88/06; H04W 84/042
    See application file for complete search history.

(56) References Cited

U.S. PATENT DOCUMENTS

| | | | |
|---|---|---|---|
| 2017/0338877 A1* | 11/2017 | Yum | H04L 27/265 |
| 2017/0374570 A1* | 12/2017 | Yi | G06F 8/433 |
| 2019/0045552 A1* | 2/2019 | Blankenship | H04W 74/0833 |
| 2019/0174327 A1* | 6/2019 | You | H04L 1/08 |
| 2019/0215909 A1* | 7/2019 | Ioffe | H04W 4/70 |
| 2020/0037186 A1* | 1/2020 | Thangarasa | H04L 1/1864 |
| 2020/0154472 A1* | 5/2020 | Kato | H04W 74/006 |

OTHER PUBLICATIONS

R4-166625; "RLM enhancements in Further enhanced MTC"; 3GPP TSG-WG4 Meeting #80 Gothenberg, Sweden, Aug. 22-26, 2016; Qualcomm (Year: 2016).*

International Search Report and Written Opinion dated Oct. 19, 2017 for PCT Application PCT/US2017/044094.

"Repetition headroom reporting for FeMTC." Source: Intel Corporation. Agenda: 8.25.3.2.2. 3GPP RAN4 #80, Ljubljana, Slovenia, Oct. 14-16, 2016. R4-167283. 4 pages.

"Discussion on CSI report in coverage enhancement." Source: MediaTek Inc. Agenda Item: 7.2.2.2.4. 3GPP TSG-RAN WGI #76, Prague, Czech Republic, Feb. 10-14, 2014. R1-140241. 4 pages.

* cited by examiner

LINK MONITORING REPETITION LEVEL FEEDBACK FOR COMMUNICATION SYSTEMS

RELATED APPLICATIONS

This application is a National Phase entry application of International Patent Application No. PCT/US2017/044094 filed Jul. 27, 2017, which claims priority to U.S. Provisional Application No. 62/402,154, filed Sep. 30, 2016, in the name of Anatoliy Ioffe et al. and is hereby incorporated by reference in its entirety.

FIELD

Various embodiments generally may relate to the field of wireless communications.

BACKGROUND

Wireless or mobile communication involves wireless communication between two or more devices. The communication requires resources to transmit data from one device to another and/or to receive data at one device from another. The communication involves establishing a communication link between the devices using the allocated or assigned resources.

The quality of performance of the communication link impacts the wireless communication between the devices. The higher the quality, the higher data rates, reliability and the like can be. If the link degrades in quality, data rates, reliability and the like can be negatively impacted. Additionally, the link can fail and break communication.

What is needed are techniques to facilitate monitoring communication links for wireless communications.

DETAILED DESCRIPTION

Figure 1:
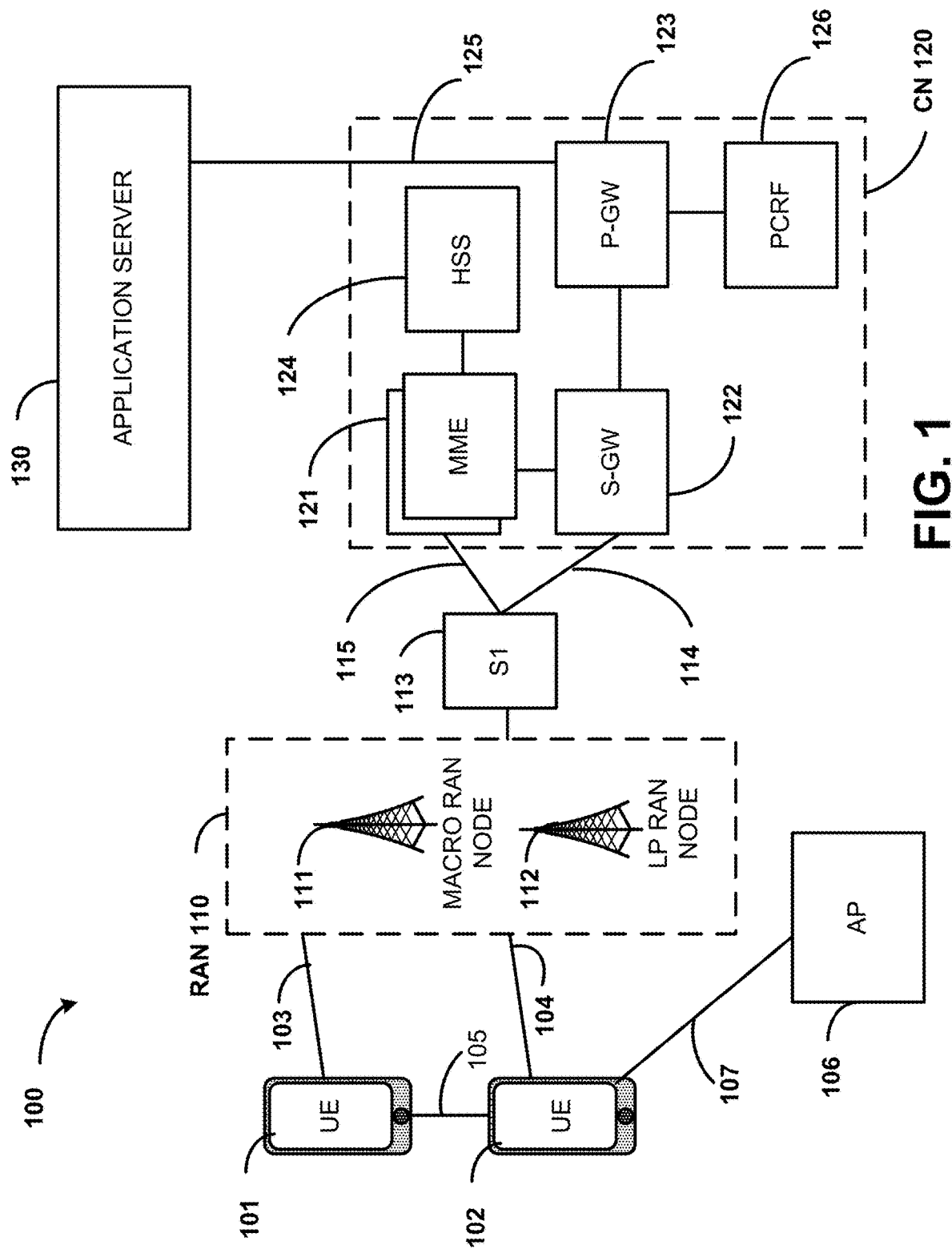
FIG. 1 illustrates a block diagram of an example wireless communications network environment for a network device (e.g., a UE or an eNB) according to various aspects or embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to RAN1 and 5G.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The evolution of machine type communication (MTC) and narrow band internet of things (NB-IoT) features in the LTE standard has continued into Rel-14 with the approval of the further enhanced MTC (FeMTC) and enhanced narrowband IoT (eNB-IoT) work items. One aspect common to both features is the usage scenario where the user equipment (UE) is expected to remain in CONNECTED mode longer than had been assumed for the Rel-13 implementation. Thus, a more efficient allocation of resources by the network is important.

Various techniques and/or embodiments are provided that facilitate radio link monitoring (RLM) procedures. The embodiments can include excess number of repetitions report (ENRR) generation and reporting. In some variations, the definition and reporting of the ENRR for FeMTC and eNB-IoT may be enhanced to function as an extension of legacy radio link monitoring (RLM) procedures.

The ENRR is used as a metric for radio link monitoring (RLM) and can describe associated user equipment (UE) behavior. The ENNR can be used to enhance feedback to a network to facilitate allocation of downlink and/or uplink resources.

The ENNR as a metric can be used by the network to determine coverage level for a UE with suitable granularity, but with the ENNR, the network is not required to account for measurement uncertainty associated with the report and can utilize the ENRR directly in repetition level (RL) allocation decisions for a next scheduled downlink transmission.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs or IoT UEs connected to the LTE network supporting either MTC or NB-IoT operation, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UEs 101 and 102 can be connected to an LTE network via the RAN interface enhanced by eMTC and/or FeMTC features, comprising one or more logical channels, including but not limited to an MTC Physical Downlink Control Channel (MPDCCH), a Physical Downlink Shared Channel (PDSCH), a Physical Uplink Shared Channel (PUSCH), and a Physical Broadcast Channel (PBCH).

The UEs 101 and 102 can be connected to an LTE NB-IoT network via the RAN interface enhanced by NB-IoT and/or eNB-IoT features, comprising one or more logical channels, including but not limited to a Narrowband Physical Downlink Control Channel (NPDCCH), a Narrowband Physical Downlink Shared Channel (NPDSCH), a Narrowband Physical Uplink Shared Channel (NPUSCH), and a Narrowband Physical Broadcast Channel (NPBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). A network device as referred to herein can include any one of these APs, ANs, UEs or any other network component. The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink (UL) and downlink (DL) dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH or NPDSCH) can carry user data and higher-layer signaling to the UEs 101 and 102. The physical downlink control channel (PDCCH or NPDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

Further embodiments can use the MTC physical downlink control channel (MPDCCH) that uses PDSCH resources for control information transmission with repetitions to overcome greater levels of noise and interference. These embodiments utilize MTC enhancements of PDSCH for data transmission with repetitions to overcome greater levels of noise and interference.

Further embodiments can use the narrowband physical downlink control channel (NPDCCH) that uses NPDSCH resources for control information transmission with repetitions to overcome greater levels of noise and interference. These embodiments utilize NPDSCH for data transmission with repetitions to overcome greater levels of noise and interference.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the CN network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In one or more embodiments, IMS services can be identified more accurately in a paging indication, which can enable the UEs 101, 102 to differentiate between PS paging and IMS service related paging. As a result, the UEs 101, 102 can apply preferential prioritization for IMS services as desired based on any number of requests by any application, background searching (e.g., PLMN searching or the like), process, or communication. In particular, the UEs 101, 102 can differentiate the PS domain paging to more distinguishable categories, so that IMS services can be identified clearly in the UEs 101, 102 in comparison to PS services. In addition to a domain indicator (e.g., PS or CS), a network (e.g., CN 120, RAN 110, AP 106, or combination thereof as an eNB or the other network device) can provide further, more specific information with the TS 36.331-Paging message, such as a "paging cause" parameter. The UE can use this information to decide whether to respond to the paging, possibly interrupting some other procedure like an ongoing PLMN search.

In one example, when UEs 101, 102 can be registered to a visited PLMN (VPLMN) and performing PLMN search (i.e., background scan for a home PLMN (HPLMN) or a higher priority PLMN), or when a registered UE is performing a manual PLMN search, the PLMN search can be interrupted in order to move to a connected mode and respond to a paging operation as part of a MT procedure/operation. Frequently, this paging could be for PS data (non-IMS data), where, for example, an application server 130 in the NW wants to push to the UE 101 or 102 for one of the many different applications running in/on the UE 101 or 102, for example. Even though the PS data could be delay tolerant and less important, in legacy networks the paging is often not able to be ignored completely, as critical services like an IMS call can be the reason for the PS paging. The multiple interruptions of the PLMN search caused by the paging can result in an unpredictable delay of the PLMN search or in the worst case even in a failure of the procedure, resulting in a loss of efficiency in network communication operations. A delay in moving to or handover to a preferred PLMN (via manual PLMN search or HPLMN search) in a roaming condition can incur more roaming charges on a user as well.

Figure 2:
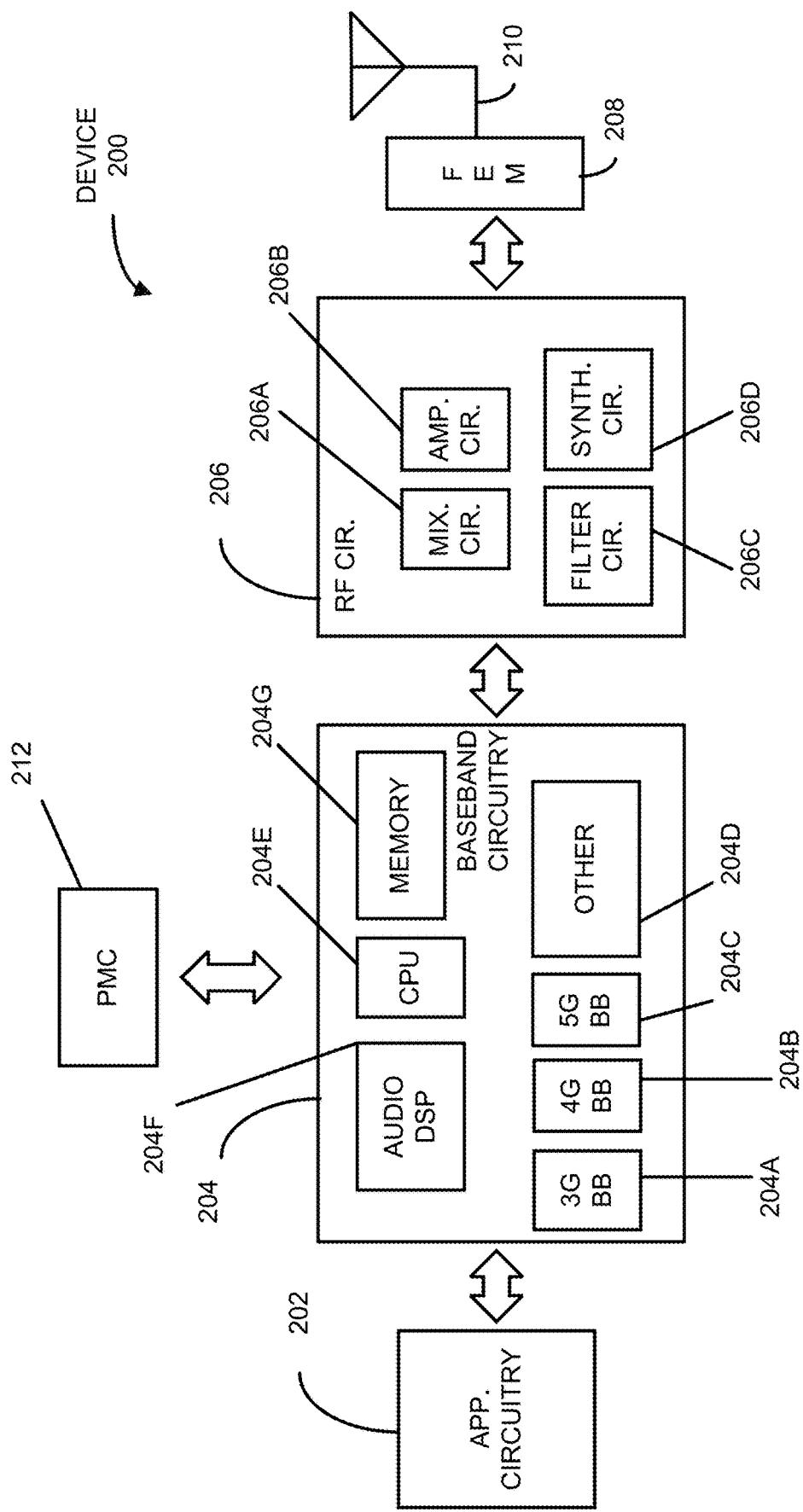
FIG. 2 illustrates another block diagram of an example of wireless communications network environment for a network device (e.g., a UE or an eNB) according to various aspects or embodiments.

FIG. 2 illustrates example components of a network device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE 101, 102 or a RAN node 111, 112, AP, AN, eNB or other network component. In some embodiments, the device 200 can include less elements (e.g., a RAN node can not utilize application circuitry 202, and instead include a processor/controller to process IP data received from an EPC). In some embodiments, the network device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 204G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In general, there is a move to provide network services for the packet domain. The earlier network services like UMTS or 3G and predecessors (2G) configured a CS domain and a packet domain providing different services, especially CS services in the CS domain as well as voice services were considered to have a higher priority because consumers demanded an immediate response. Based on the domain that the paging was received, the device 200 could assign certain priority for the incoming transaction. Now with LTE/5G most services are moving to the packet domain. Currently, the UE (e.g., 101, 102, or device 200) can get paging for a packet service without knowing any further information about the paging of the MT procedure, such as whether someone is calling on a line, a VoIP call, or just some packet utilized from Facebook, other application service, or other similar MT service. As such, a greater opportunity exists for further delays without the possibility for the UE to discriminate between the different application packets that could initiate a paging and also give a different priority to it based on one or more user preferences. This can could be important for the UE because the UE might be doing other tasks more vital for resource allocation.

In one example, a UE (e.g., 101, 102, or device 200) could be performing a background search for other PLMNs. This is a task the UE device 200 could do in regular intervals if it is not connected on its own home PLMN or a higher priority PLMN, but roaming somewhere else. A higher priority could be a home PLMN or some other PLMNs according to a list provided by the provider or subscriber (e.g., HSS 124). Consequently, if a paging operation arrives as an MT service and an interruption results, such that a start and begin operation are executed, a sufficient frequency of these interruptions could cause the UE to never complete a background search in a reasonable way. This is one way where it would be advantageous for the UE or network device to know that the interruption is only a packet service, with no need to react to it immediately, versus an incoming voice call that takes preference immediately and the background scan should be postponed.

Additionally, the device 200 can be configured to connect or include multiple subscriber identity/identification module (SIM) cards/components, referred to as dual SIM or multi SIM devices. The device 200 can operate with a single transmit and receive component that can coordinate between the different identities from which the SIM components are operating. As such, an incoming voice call should be responded to as fast as possible, while only an incoming packet for an application could be relatively ignored in order to utilize resources for the other identity (e.g., the voice call or SIM component) that is more important or has a higher priority from a priority list/data set/or set of user device preferences, for example. This same scenario can also be utilized for other operations or incoming data, such as with a PLMN background search such as a manual PLMN search, which can last for a long period of time since, especially with a large number of different bands from 2G, etc. With an ever increasing number of bands being utilized in wireless communications, if paging interruptions come in between the operations already running without distinguishing between the various packet and real critical services such as voice, the network devices can interpret this manual PLMN search to serve and ensure against a drop or loss of any increment voice call, with more frequent interruptions in particular.

As stated above, even though in most of these cases the PS data is delay tolerant and less important, in legacy networks the paging cannot be ignored completely, as critical services like an IMS call can be the reason for the PS paging. The multiple interruptions of a PLMN search caused by the paging can result in an unpredictable delay of the PLMN search or in the worst case even in a failure of the procedure. Additionally, a delay in moving to preferred PLMN (via manual PLMN search or HPLMN search) in roaming condition can incur more roaming charges on user. Similarly, in multi-SIM scenario when UE is listening to paging channel of two networks simultaneously and has priority for voice service, a MT IMS voice call can be interpreted as "data" call as indicated in MT paging message and can be preceded by MT Circuit Switched (CS) paging of an other network or MO CS call initiated by user at same time. As such, embodiments/aspects herein can increase the call drop risk significantly for the SIM using IMS voice service.

In embodiments, 3GPP NW can provide further granular information about the kind of service the network is paging for. For example, the Paging cause parameter could indicate one of the following values/classes/categories: 1) IMS voice/video service; 2) IMS SMS service; 3) IMS other services (not voice/video/SMS-related; 4) any IMS service; 5) Other PS service (not IMS-related). In particular, a network device (e.g., an eNB or access point) could only be discriminating between IMS and non-IMS services could use 4) and 5), whereas a network that is able to discriminate between different types of IMS services (like voice/video call, SMS, messaging, etc.) could use 3) instead of 4) to explicitly indicate to the UE that the paging is for an IMS service different from voice/video and SMS. By obtaining this information UE may decide to suspend PLMN search only for critical services like incoming voice/video services.

In other aspects, dependent on the service category (e.g., values or classes 1-5 above), the UE 101, 102, or device 200 can memorize that there was a paging to which it did not respond, and access the network later, when the PLMN search has been completed and the UE decides to stay on the current PLMN. For example, if the reason for the paging was a mobile terminating IMS SMS, the MME can then inform the HSS (e.g., 124) that the UE is reachable again, and the HSS 124 can initiate a signaling procedure which will result in a delivery of the SMS to the UE once resources are more available or less urgent for another operation/application/or category, for example. To this purpose the UE 101, 102, or 200 could initiate a periodic tau area update (TAU) procedure if the service category in the Paging message indicated "IMS SMS service", for example.

Figure 3:
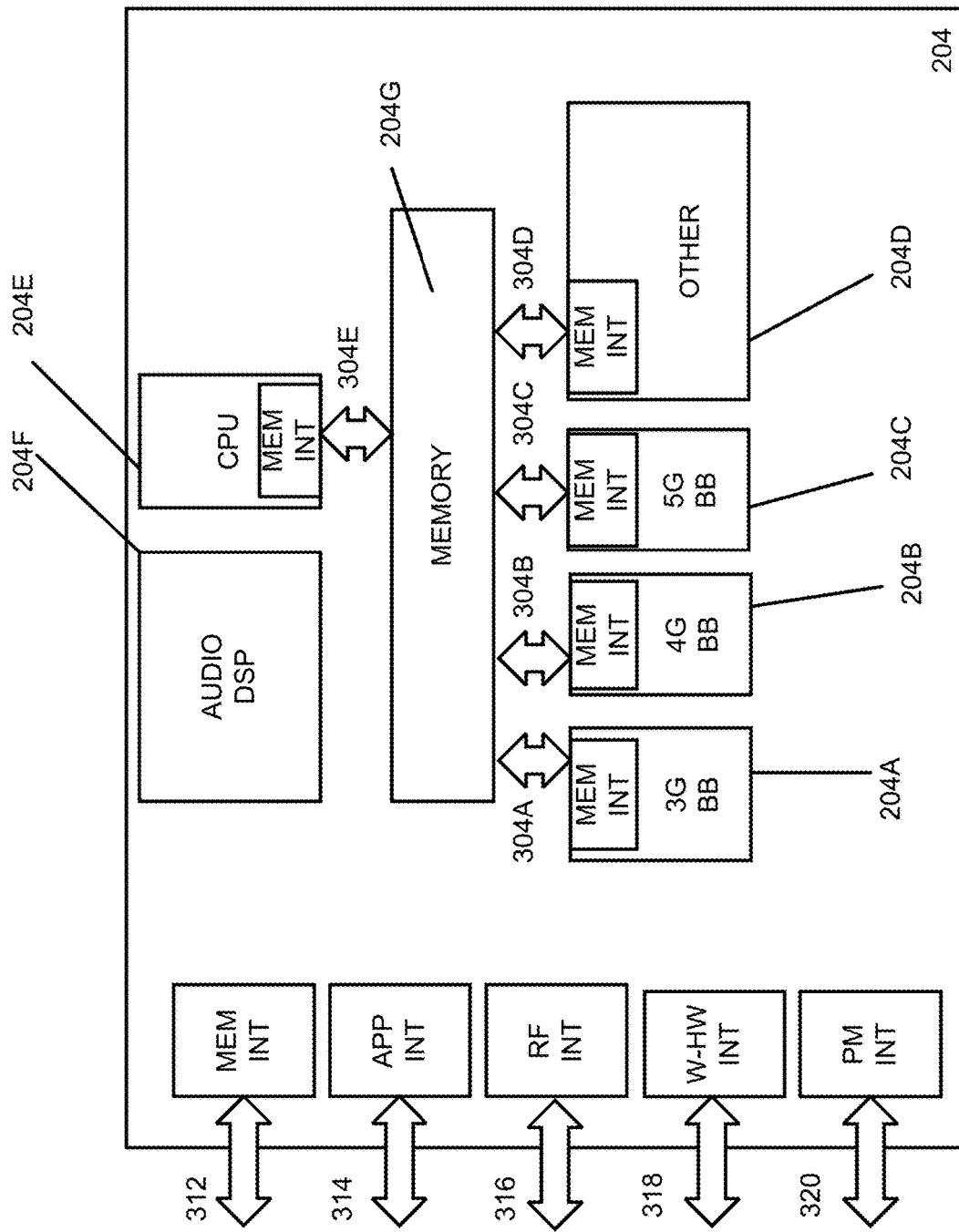
FIG. 3 another block diagram of an example of wireless communications network environment for network device (e.g., a UE or an eNB) with various interfaces according to various aspects or embodiments.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
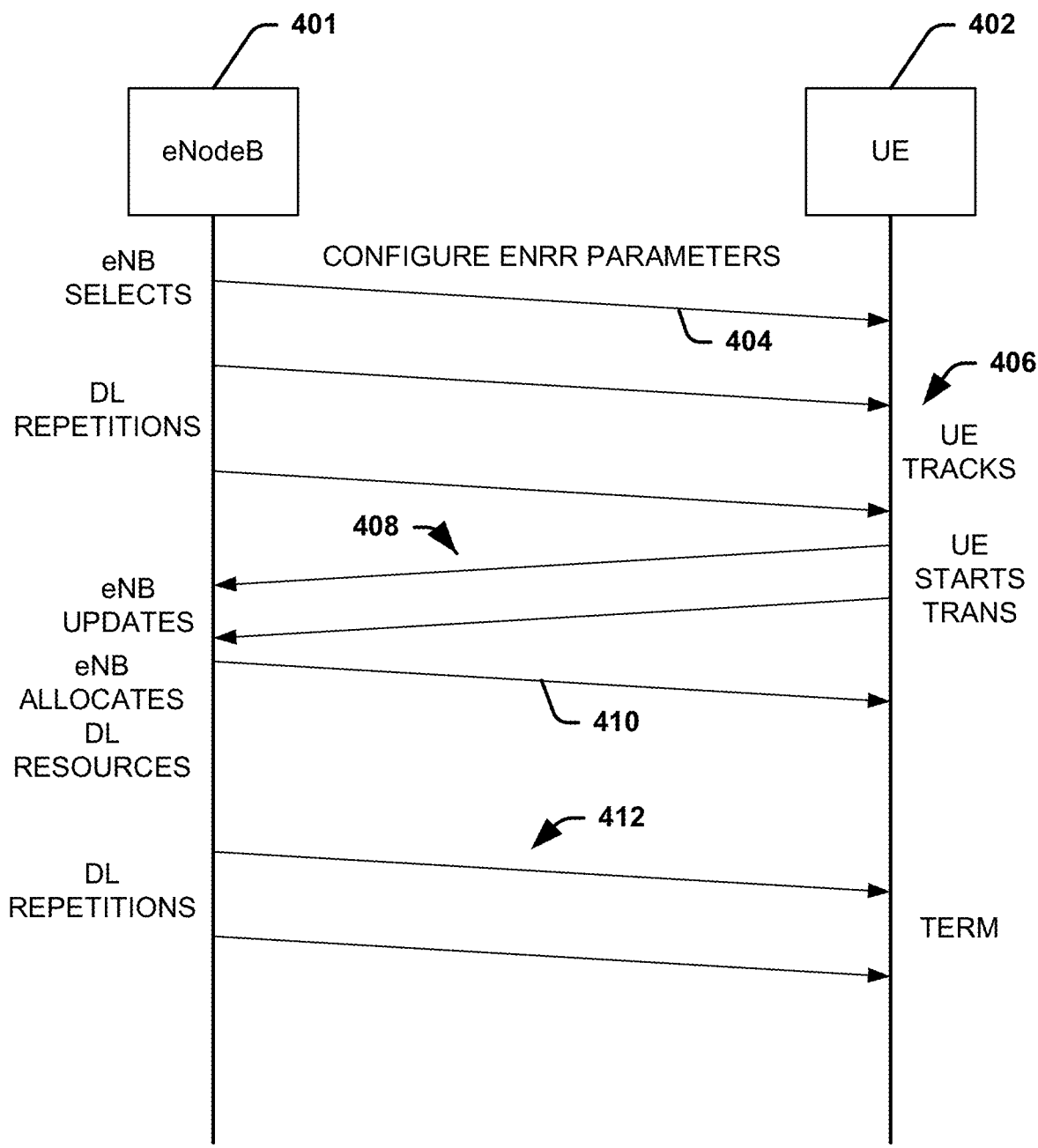
FIG. 4 is a diagram illustrating a system for allocation of system resources using radio link monitoring (RLM)

FIG. 4 is a diagram illustrating a system 400 for allocation of system resources using radio link monitoring (RLM). The system 400 can be utilized with the above embodiments and variations thereof, including the system 100. The system 400 is provided as an example and it is appreciated that suitable variations are contemplated.

The system 400 includes a node 401 and a user equipment (UE) device 402. The device 401 is shown as an eNB for illustrative purposes. It is appreciated that the UE device 402 can be other network devices, such as APs, ANs and the like. It is also appreciated that the eNB 401 can be other nodes or access nodes (ANs), such as BSs, gNB, RAN nodes and the like.

Generally, a network and its devices attempt manage and allocate uplink and downlink resources for UE devices and other devices. The allocation of resources includes the aspects of the resources, such as repetitions, assigned resources and the like. The allocation or resources can be a tradeoff between latency, data rate and repetition levels (RLs). For example, the repetition levels can be increased to improve reliability, but the increase can utilize greater overhead.

Radio link monitoring (RLM) is used to monitor or track radio conditions between UEs and other network devices. The RLM can be used for cell formation, failure identification, resource allocation and the like.

A signal used for enhanced RLM is the excess number or repetitions report (ENRR). The ENRR is provided by UEs and indicates repetitions above a threshold value occur. The ENRR can also indicate repetitions that occur below or less than the threshold value.

The ENNR has parameters that are pre-configured and/or configured with upper layer signaling, such as the MAC layer.

The eNB 401 is configured to select/allocate communication parameters or resources, which include downlink (DL) resources and uplink (UL) resources. The downlink resources include downlink (DL) modulation and coding scheme (MCS), DL repetition level (RL) and the like. The communication parameters can also include uplink (UL) number of tones, subcarrier spacing, UL MCS, and UL RL.

The eNB 401 is configured to allocate DL and UL resources, including, for example, the number of tones, subcarrier spacing, the MCS and the DL RL.

The eNB 401 transmits the allocated resources or allocation of resources at 404. The UE 402 receives the allocated DL resources and monitors for transmission of DL data from the eNB 401.

The eNB 401 then transmits DL data to the UE 402 using the allocated resources, including the DL RL. The DL data can be transmitted using a PDSCH and/or PDCCH. The DL data also includes or can include an ENRR request for the UE 402. The eNB 401 also allocates and transmits UL resources for uplink communication. The UL resources include, for example, number of tones, subcarrier spacing, UL MCS, and UL RL.

The DL data transmission is repeated a number of times at 406 depending on the RL. It is appreciated that the UE 402 may not need to use some or all of the repetitions of the DL data transmission to properly receive the DL data transmission.

The UE 402 maintains or tracks the number of repetitions used to correctly decode the transmitted DL data and the DL RL as configured by the eNB 401 as indicated at 406. The UE 402 compares the tracked repetitions with RL thresholds, including a RL increment threshold (R_inc) and an RL decrement threshold (R_dec). The UE 402 can be triggered to generate an ENRR and provide repetition feedback based on the comparison(s) with the ENRR. It is appreciated that the R_inc and the R_dec can be the same value.

Thus, if the tracked repetitions are greater than R_inc, the UE generates the repetition feedback with an indication to increment or increase the RL. If the tracked repetitions are less than R_dec, the UE generates the repetition feedback with an indication to decrement or decrease the RL.

The repetition feedback provides an indication of radio link quality. If the link quality degrades, more repetitions or RL can be used to maintain suitable reliability. Further, if the link quality increases, less repetitions or RL can be used and maintain suitable reliability.

The ENRR is designed/configured to include the repetition feedback. In one example, the definition and reporting of an ENRR for FeMTC is enhanced as an extension of legacy radio link monitoring (RLM) procedures. In another example, the definition and reporting of an ENRR for eNB-IoT is enhanced as an extension of legacy RLM procedures.

The UE 402 can be configured to apply averaging and the like with prior tracked repetitions before comparing the current tracked repetitions with the RL thresholds. In one example, L3 averaging is applied along with coefficients provided by higher layers.

The network and/or the eNB 401 configure the RL thresholds based on resource utilization to enhance resource allocation.

The UE 402 transmits uplink data and an ENRR to the eNB 401 at 408 using the allocated UL resources. The uplink transmission uses physical uplink channels, such as PUCCH and/or PUSCH. The ENRR includes the repetition feedback based on the tracked number of used repetitions used by the UE 402 to correctly decode the transmitted DL data at 406. The uplink transmission is repeated a number of times depending on the UL RL.

The eNB 401 also maintains or tracks the number of repetitions used to correctly decode the transmitted UL data by the UE 402.

The eNB 401 updates or modifies the allocation of DL resources or DL resource allocation based on the ENNR and the repetition feedback, which can include the tracked number of repetitions to correctly decode the transmitted DL data. The updates are based on at least the tracked number of repetitions, the DL RL, and other information from the ENRR.

In one example, if the tracked repetitions exceed the R_inc value, the repetition feedback includes an indication to increase the DL RL and the eNB 401 increases the DL RL by an amount. Thus, the number of repetitions for DL is increased.

If the tracked repetitions are below the R_dec, the repetition feedback includes an indication to decrease the DL RL and the eNB 401 decreases the DL RL by an amount. Thus, the number of repetitions for DL is decreased. The increase amount and the decrease amount can be based on DL resources available, utilization and the like.

In another example, the increase amount and the decrease amount are determined by the network to provide suitable values for RL, TBS, MCS and the like. Higher layer signaling can configure and/or reconfigure the values of R_dec and R_inc based on propagation conditions, downlink signal strength, DL reference signal received power (RSRP)/reference signal received quality (RSRQ), frequency, modulation and coding scheme (MCS), coverage levels, CE modes, physical random access channel (PRACH) repetition level and the like.

In another example, the eNB 401 is configured to reconfigure the thresholds R_dec and R_inc based on the propagation conditions, downlink signal strength, DL reference signal received power (RSRP)/reference signal received quality (RSRQ), frequency, modulation and coding scheme (MCS), coverage levels, CE modes, physical random access channel (PRACH) repetition level and the like.

The eNB 401 transmits the updated allocated resources or updated allocation/aspects of resources at 410. The UE 402 receives the allocated resources and monitors for transmission of DL data from the eNB 401.

The eNB 401 then transmits DL data to the UE 402 at 412 using the allocated resources, including the updated DL RL at 412. The DL data can be transmitted using a PDSCH and/or PDCCH. The DL data can also include another ENRR request for the UE 402.

The DL data transmission is repeated a number of times, depending on the updated DL RL. It is appreciated that the UE 402 may not need to use some or all of the repetitions of the DL data transmission to properly receive the DL data transmission.

The UE 402 can again maintain or track the number of repetitions used to correctly decode the transmitted DL data. In one example, the updated DL RL results in the tracked number of actual repetitions used being closer to the updated downlink RL.

The system 400 facilitates maintaining longer connections while enhancing utilization of available resources. This can be accomplished by reducing the RL when suitable. Further, reliability and performance is enhanced by increasing the RL when suitable. Thus, a more efficient allocation of resources by the network can be obtained.

Figure 5:
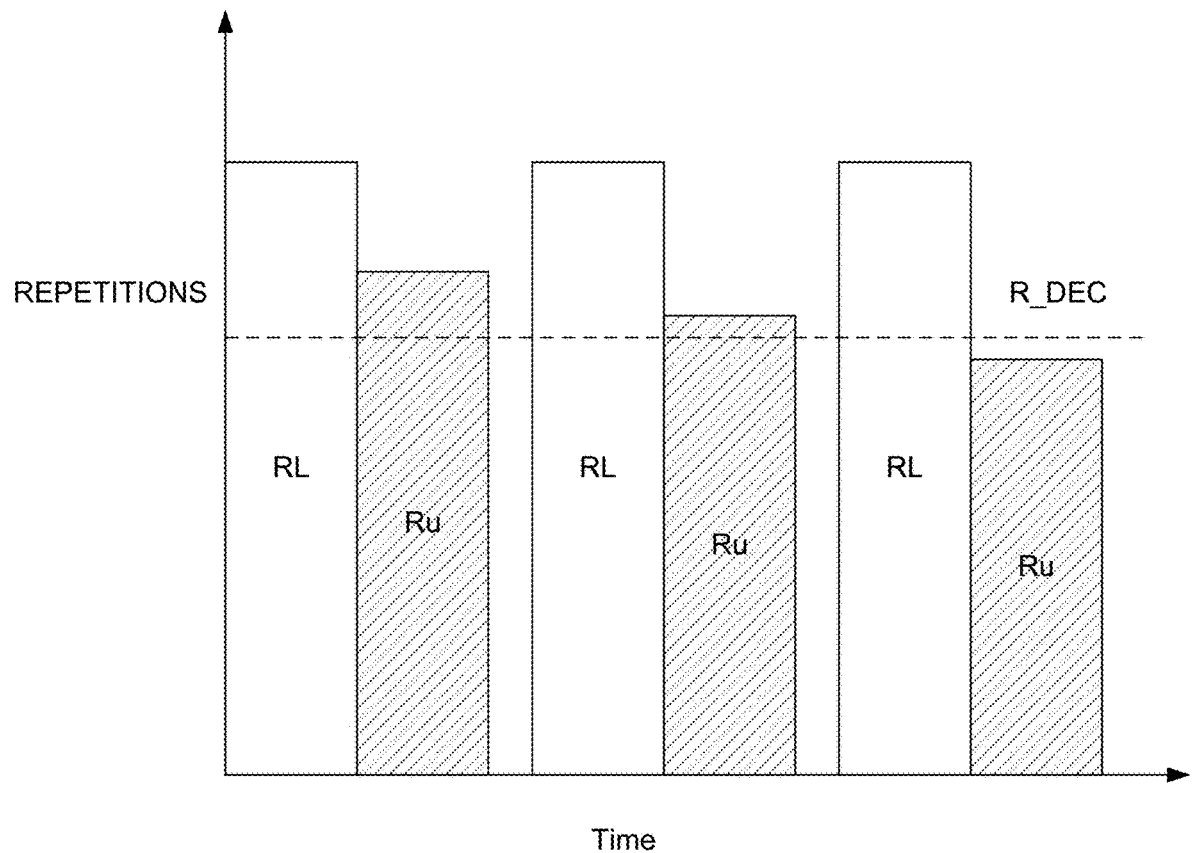
FIG. 5 is a graph illustrating generation of repetition level feedback based on a repetition decrease threshold.

FIG. 5 is a graph illustrating generation of repetition level feedback 500 based on a repetition decrease threshold. The feedback 500 can be utilized with the above embodiments and variations thereof, including the system 100. The feedback 500 is provided as an example and it is appreciated that suitable variations are contemplated.

The graph depicts time along an x-axis and repetitions along a y-axis. A repetition level (RL) is shown in successive examples. The RL is greater than 1 and indicates a number of repetitions of a transmissions of data from a node to a UE.

The UE tracks an actual number of repetitions used to correctly decode the transmitted data. The tracked actual number of repetitions is denoted as Ru. Generally, the lower the Ru, the better the quality of the link and the associated propagation conditions.

The feedback 500 shows three examples of tracked repetitions. It can be seen that the propagation conditions improve over time, which is reflected in that the tracked repetitions Ru decrease over time.

The tracked repetitions Ru can be compared with repetition decrease threshold, shown as R_dec. The repetition decrease threshold is typically configured by a network using upper layer signaling and is generally based on operating or deployment conditions, such as UE mobility conditions, UE coverage enhancement (CE) level, transmit block size (TBS), modulation and coding scheme (MCS) and/or the like. The derivation can be performed at a node, such as an eNB.

In the first example, the tracked repetitions Ru are compared with R_dec. The tracked repetitions Ru are greater than R_dec, thus the UE does not send an indication to decrement or reduce the RL.

In the second example, the tracked repetitions Ru are less than the first example. However, the tracked repetitions Ru are greater than R_dec, thus the UE does not send an indication to decrement or reduce the RL.

In the third example, the tracked repetitions Ru are less than the first and second examples. Additionally, the tracked repetitions Ru are less than R_dec and the UE is triggered to send repetition feedback that includes an indication to decrement or reduce the RL as part of an ENRR. The UE can send additional information with the indication to decrement and the ENRR including, for example, the R_dec, the tracked repetitions Ru, and other related information.

The ENRR with the repetition feedback can be transmitted by the UE using UL resources, such as PUCCH, PUSCH, and the like.

Figure 6:
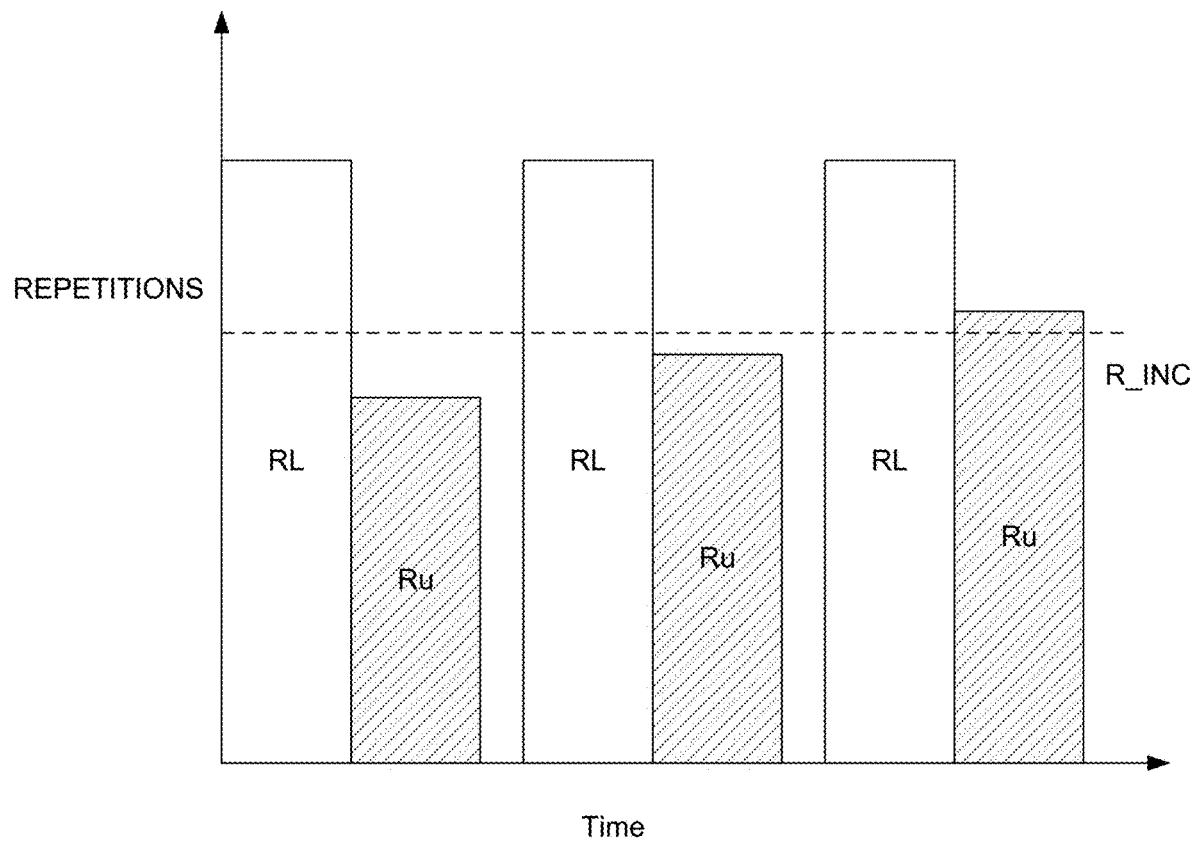
FIG. 6 is a graph illustrating generation of repetition level feedback based on a repetition increase threshold.

FIG. 6 is a graph illustrating generation of repetition level feedback 600 based on a repetition increase threshold. The feedback 600 can be utilized with the above embodiments and variations thereof, including the system 100. The feedback 600 is provided as an example and it is appreciated that suitable variations are contemplated.

The graph depicts time along an x-axis and repetitions along a y-axis. A repetition level (RL) is shown in successive examples. The RL is greater than 1 and indicates a number of repetitions of a transmissions of data from a node to a UE.

The UE tracks an actual number of repetitions used to correctly decode the transmitted data. The tracked actual number of repetitions is denoted as Ru. Generally, the lower the Ru, the better the quality of the link and the associated propagation conditions.

The feedback 600 shows three examples of tracked repetitions. It can be seen that the propagation conditions degrade over time, which is reflected in that the tracked repetitions Ru increase over time.

The tracked repetitions Ru can be compared with a repetition increase threshold, shown as R_inc. The repetition increase threshold R_inc is typically configured by a network using upper layer signaling and is generally based on operating or deployment conditions, such as UE mobility conditions, UE coverage enhancement (CE) level, transmit block size (TBS), modulation and coding scheme (MCS) and/or the like. The derivation can be performed at a node, such as an eNB.

In the first example, the tracked repetitions Ru are compared with R_dec. The tracked repetitions Ru are less than R_inc, thus the UE does not send an indication to increment or increase the RL.

In the second example, the tracked repetitions Ru are greater than the first example. However, the tracked repetitions Ru are still less than R_inc, thus the UE does not send an indication to increment or increase the RL.

In the third example, the tracked repetitions Ru are greater than the first and second examples. Additionally, the tracked repetitions Ru are greater than R_inc and the UE is triggered to send repetition feedback that includes an indication to increment or increase the RL as part of an ENRR. The UE can send additional information with the indication to decrement and the ENRR including, for example, the R_inc, the tracked repetitions Ru, and other related information.

The ENRR with the repetition feedback can be transmitted by the UE using UL resources, such as PUCCH, PUSCH, and the like.

In some embodiments, as the UE receives subframes configured for RL>1, it maintains a running statistic of the ratio of the actual number of repetitions used by the UE to correctly decode the transmitted data to the configured RL. The ratio is provided as part of the repetition feedback. The R_inc and R_dec thresholds may then be configured in terms of this ratio.

In some other embodiments, as the UE receives subframes configured for RL>1, a running statistic of the ratio of the difference of the configured RL and the actual number of repetitions used by the UE to correctly decode the transmitted data to the configured RL is maintained. The difference ratio is provided as part of the repetition feedback. The R_inc and R_dec thresholds can be configured in terms of this difference ratio.

In some embodiments, the UE is in idle mode and receives traffic related paging. An ENRR may be generated and an indication and repetition feedback may be transmitted to the network in one or more of the following techniques: as ENRR bundled with UL transmissions during cell reselection procedures, as R_dec/R_inc ENRR indication(s), where the R_dec/R_inc thresholds may either be persistent network-defined configurations, default standard-defined configurations, and/or estimated by the UE.

Figure 7:
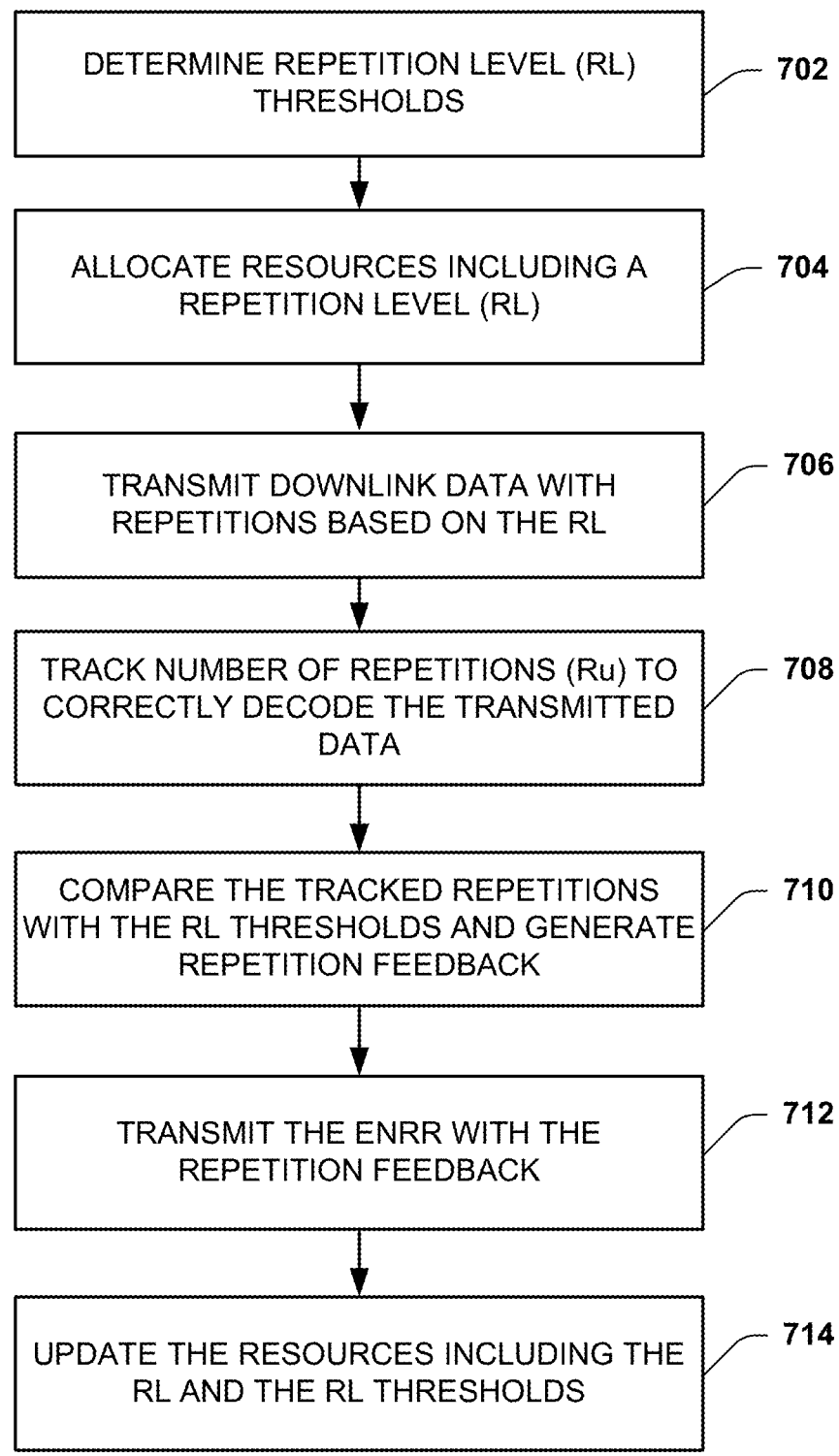
FIG. 7 is a flow diagram illustrating a method for allocation of system resources using radio link monitoring (RLM).

FIG. 7 is a flow diagram illustrating a method 700 for allocation of system resources using radio link monitoring (RLM). The method or process 700 is described with reference to a UE device and a node, however it is appreciated that other device and/or nodes can be used. For example, the node can be other types of nodes, such as an eNB, gNB and the like. The method 700 can be implemented using the above systems, arrangements, circuitry, baseband circuitry and variations thereof, including, for example, the system 100.

The method 700 begins at block 702, where a node determines RL thresholds based on current or estimated propagation conditions and the like. The node can also determine or configure other ENRR parameters based on the propagation conditions and the like.

The node allocates and transmits UL and DL resources at block 704. The resources include MCS, RL, number of tones, subcarrier spacing and the like. A UE is configured to monitor and receive the resource allocation, including the RL thresholds.

The node transmits data at block 706 using the allocated resources for a number of repetitions based on the RL. The data can include a request for an ENRR. The data can be provided within a PDSCH and/or PDCCH, in one example.

The UE monitors for the transmission, receives the transmitted data from the node and tracks the number of repetitions used to correctly decode the transmitted data at block 708.

The UE compares the tracked repetitions with the RL thresholds at block 710 to generate repetition feedback and an ENRR with the repetition feedback. The repetition feedback can include an indication to increment or decrement the RL, the tracked repetitions, a ratio of tracked repetitions to the RL, and the like.

In one example, the tracked repetitions are scaled and/or modified by a weighting. In another example, the tracked repetitions are averaged with one or more previous values before comparing with the RL thresholds.

The UE transmits the ENRR with the repetition feedback at block 712. The UE uses an uplink channel, such as a PUCCH, PUSCH and the like.

The Node receives the ENRR with the repetition feedback and updates resources or the allocation of resources based on the repetition feedback at block 714. The updated resources or allocation of resources include the RL, the RL thresholds and the like.

The method 700 can be repeated or re-utilized for additional updating of resources, including the RL. It is appreciated that suitable variations of the method 700 are contemplated.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed within a base station. The apparatus comprises baseband circuitry which includes a radio frequency (RF) interface and one or more processors. The one or more processors are configured determine repetition level (RL) thresholds, allocate downlink resources, wherein the downlink resources include a repetition level (RL), send downlink data to the RF interface for transmission to a user equipment (UE) according to the RL, receive repetition feedback from the RF interface based on the transmission to the UE, and update the allocation of downlink resources based on the repetition feedback.

Example 2 includes the subject matter of Example 1, including or omitting optional elements, wherein the repetition feedback is part of an excess number of repetitions report (ENRR).

Example 3 includes the subject matter of any of Examples 1-2, including or omitting optional elements, where repetition feedback indicates that a tracked number of repetitions used to correctly decode the downlink data is greater than an RL increment threshold of the RL thresholds.

Example 4 includes the subject matter of any of Examples 1-3, including or omitting optional elements, where repetition feedback indicates that a tracked number of repetitions used to correctly decode the downlink data is less than an RL decrement threshold of the RL thresholds.

Example 5 includes the subject matter of any of Examples 1-4, including or omitting optional elements, where the DL resources include a modulation and coding scheme (MCS) and subcarrier spacing.

Example 6 includes the subject matter of any of Examples 1-5, including or omitting optional elements, where the one or more processors are configured to adjust the RL based on the repetition feedback.

Example 7 includes the subject matter of any of Examples 1-6, including or omitting optional elements, where the one or more processors are configured to compare the repetition feedback with one or more prior repetition feedback and to update the RL at least partially based on the comparison.

Example 8 includes the subject matter of any of Examples 1-7, including or omitting optional elements, where the one or more processors are configured to determine an RL increase amount or an RL decrease amount based on one or more of the repetition feedback, the downlink resources, and utilization of the downlink resources.

Example 9 includes the subject matter of any of Examples 1-8, including or omitting optional elements, where the one or more processors are configured to receive an RL increase amount and an RL decrease amount from a network via the RF interface.

Example 10 includes the subject matter of any of Examples 1-9, including or omitting optional elements, where an RL increase for the RL is based on propagation conditions.

Example 11 includes the subject matter of any of Examples 1-10, including or omitting optional elements, where the base station is an evolved Node B (eNB).

Example 12 is an apparatus for a user equipment (UE) device having baseband circuitry. The baseband circuitry includes a radio frequency (RF) interface and one or more processors. The one or more processors are configured to obtain repeated downlink transmissions from the RF interface from a base station, track a number of repetitions to correctly decode downlink data from the repeated downlink transmissions, and generate repetition feedback based on the tracked number of repetitions and a repetition level (RL).

Example 13 includes the subject matter of Example 12, including or omitting optional elements, where the one or more processors are configured to generate an excess number of repetitions report (ENRR) that includes the repetition feedback and provide the ENNR to the RF interface for transmission to a base station.

Example 14 includes the subject matter of any of Examples 12-13, including or omitting optional elements, where the one or more processors are configured to average the tracked repetitions with one or more previous tracked repetitions.

Example 15 includes the subject matter of any of Examples 12-14, including or omitting optional elements, where the one or more processors are configured to compare the tracked repetitions with an RL threshold to at least partially generate the repetition feedback.

Example 16 includes the subject matter of any of Examples 12-15, including or omitting optional elements, where the one or more processors are configured to receive allocated downlink resources via the RF interface, wherein the allocated downlink resources include the RL.

Example 17 includes the subject matter of any of Examples 12-16, including or omitting optional elements, where the one or more processors are configured to receive updated downlink resources via the RF interface, wherein the updated downlink resources are at least partially based on the repetition feedback.

Example 18 includes one or more computer-readable media having instructions that, when executed, cause a base station to allocate downlink resources, wherein the downlink resources include a repetition level (RL), send downlink data to the RF interface for transmission to a user equipment (UE) according to the RL, receive repetition feedback from the RF interface, wherein the repetition feedback is based on the transmission to the UE, and update the RL based on the repetition feedback.

Example 19 includes the subject matter of Example 18, including or omitting optional elements, where the instructions, when executed further cause the base station to determine one or more RL thresholds.

Example 20 includes the subject matter of any of Examples 18-19, including or omitting optional elements, where the instructions, when executed further cause the base station to update the RL based on the repetition feedback and one or more previous RLs.

Example 21 is an apparatus for a base station. The apparatus includes a means to transmit the allocated downlink resources to a user equipment (UE) device, a means to transmit downlink data according to a repetition level (RL), a means to receive repetition feedback in response to the transmitted downlink data, and a means to update the RL based on the repetition feedback.

Example 22 includes the subject matter of Example 21, including or omitting optional elements, further comprising a means to allocate downlink resources including the RL.

Example 23 is an apparatus for a user equipment (UE) device. The apparatus includes a means to obtain repeated downlink transmissions from a base station, a means to track a number of repetitions to correctly decode downlink data from the repeated downlink transmissions, and a means to generate repetition feedback based on the tracked number of repetitions and a repetition level (RL).

Example 24 includes the subject matter of Example 23, including or omitting optional elements, further comprising a means to receive downlink resources, wherein the downlink resources include the RL.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a base station, comprising baseband circuitry having:
    a radio frequency (RF) interface; and
    one or more processors configured to:
        determine repetition level (RL) thresholds;
        allocate downlink (DL) resources, wherein the downlink resources include an indication of a repetition level (RL) and an indication of the RL thresholds;
        send downlink data to the RF interface for transmission to a user equipment (UE) according to the RL;
        receive repetition feedback from the RF interface based on the transmission to the UE
            wherein repetition feedback indicates that a tracked number of repetitions used to correctly decode the downlink data is greater than an RL increment threshold of the RL thresholds, or
            wherein repetition feedback indicates that a tracked number of repetitions used to correctly decode the downlink data is less than an RL decrement threshold of the RL thresholds; and
        update the allocation of downlink resources based on the repetition feedback.

2. The apparatus of claim 1, wherein the repetition feedback is part of an excess number of repetitions report (ENRR).

3. The apparatus of claim 1, wherein the DL resources include a modulation and coding scheme (MCS) and subcarrier spacing.

4. The apparatus of claim 1, wherein the one or more processors are configured to adjust the RL based on the repetition feedback.

5. The apparatus of claim 1, wherein the one or more processors are configured to compare the repetition feedback with one or more prior repetition feedback and to update the RL at least partially based on the comparison.

6. The apparatus of claim 1, wherein the one or more processors are configured to determine an RL increase amount or an RL decrease amount based on one or more of the repetition feedback, the downlink resources, and utilization of the downlink resources.

7. The apparatus of claim 1, wherein the one or more processors are configured to receive an RL increase amount and an RL decrease amount from a network via the RF interface.

8. The apparatus of claim 1, wherein an RL increase for the RL is based on propagation conditions.

9. The apparatus of claim 1, wherein the base station is an evolved Node B (eNB).

10. An apparatus for a user equipment (UE) device, comprising baseband circuitry having:
    a radio frequency (RF) interface; and
    one or more processors configured to:
        obtain repeated downlink transmissions from the RF interface from a base station;
        track a number of repetitions to correctly decode downlink data from the repeated downlink transmissions; and generate repetition feedback based on the tracked number of repetitions tracked at the UE compared to a received RL threshold value, and on a received repetition level (RL) value, wherein the repetition feedback indicates that the tracked number of repetitions used to correctly decode the downlink data is greater than an RL increment threshold that comprises the received RL threshold value, or wherein the repetition feedback indicates that the tracked number of repetitions used to correctly decode the downlink data is less than an RL decrement threshold that comprises the received the RL threshold value.

11. The apparatus of claim 10, wherein the one or more processors are configured to generate an excess number of repetitions report (ENRR) that includes the repetition feedback and provide the ENRR to the RF interface for transmission to a base station.

12. The apparatus of claim 10, wherein the one or more processors are configured to average the tracked repetitions with one or more previous tracked repetitions.

13. The apparatus of claim 10, wherein the one or more processors are configured to receive allocated downlink resources via the RF interface, wherein the allocated downlink resources include the RL.

14. The apparatus of claim 10, wherein the one or more processors are configured to receive updated downlink resources via the RF interface, wherein the updated downlink resources are at least partially based on the repetition feedback.

15. One or more non-transitory computer-readable media having instructions that, when executed, cause a base station to:

allocate downlink resources, wherein the downlink resources include an indication of a repetition level (RL) and an indication of one or more RL thresholds;

send downlink data to an RF interface for transmission to a user equipment (UE) according to the RL;

receive repetition feedback comprising a number of repetitions needed to correctly decode downlink data from the repeated downlink transmissions from the RF interface, wherein the repetition feedback is based on the transmission to the UE, wherein repetition feedback indicates that the number of repetitions used to correctly decode the downlink data is greater than an RL increment threshold of one or more RL thresholds, or wherein repetition feedback indicates that the number of repetitions used to correctly decode the downlink data is less than an RL decrement threshold of the one or more RL thresholds; and update the RL based on the repetition feedback.

16. The one or more non-transitory computer-readable media of claim 15, comprising instructions that, when executed, further cause the base station to update the RL based on the repetition feedback and one or more previous RLs.

* * * * *